US012151483B2

(12) United States Patent
Kato

(10) Patent No.: US 12,151,483 B2
(45) Date of Patent: Nov. 26, 2024

(54) LIQUID DISCHARGE APPARATUS

(71) Applicant: CANON KABUSHIKI KAISHA, Tokyo (JP)

(72) Inventor: Maki Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/057,668

(22) Filed: Nov. 21, 2022

(65) Prior Publication Data

US 2023/0166521 A1 Jun. 1, 2023

(30) Foreign Application Priority Data

Nov. 29, 2021 (JP) ................................ 2021-192910

(51) Int. Cl.
*B41J 2/175* (2006.01)

(52) U.S. Cl.
CPC ................................ *B41J 2/17566* (2013.01)

(58) Field of Classification Search
CPC .................... B41J 2/17566; B41J 2002/17579
See application file for complete search history.

(56) References Cited

U.S. PATENT DOCUMENTS 5,988,783 A * 11/1999 Tajika .................. B41J 2/17566 347/7

FOREIGN PATENT DOCUMENTS

JP 2003080717 A 3/2003

* cited by examiner

*Primary Examiner* — Lisa Solomon
(74) *Attorney, Agent, or Firm* — Canon U.S.A., Inc. IP Division

(57) ABSTRACT

A liquid discharge apparatus includes a substrate, a discharge port configured to discharge ink, a flow path forming member formed on the substrate and in which a flow path configured to supply liquid to the discharge port is formed, a detection unit arranged between the substrate and the flow path forming member and formed of a material of which an electrical resistance value changes by contacting the liquid, and a measurement unit configured to measure the electrical resistance value of the detection unit.

6 Claims, 7 Drawing Sheets

LIQUID DISCHARGE APPARATUS

BACKGROUND

Field of the Disclosure

The present disclosure relates to a liquid discharge apparatus capable of detecting the peeling of a flow path forming member.

Description of the Related Art

A liquid discharge apparatus configured to perform recording by discharging liquid (ink) is provided with a recording element substrate including discharge ports for discharging liquid, heating elements for film boiling the liquid, and a substrate. Along with the speeding-up of recording, there may be a case where the recording element substrate needs to be longer.

When the recording element substrate is made longer, stresses are generated in the recording element substrate due to differences between linear expansion coefficients of components configuring the recording element substrate. For example, in a case where a silicon substrate and a flow path forming member made of a resin material in which a flow path is formed are joined, a distortion is generated by the stress between the substrate and the flow path forming member, and the flow path forming member may peel away from the substrate.

Japanese Patent Application Laid-open No. 2003-80717 discusses a liquid discharge apparatus capable of restraining the occurrence of peeling between the substrate and the flow path forming member caused by the distortion, by forming a groove surrounding the outer side of the flow path in the flow path forming member.

In a case where ink containing a high proportion of solvent with a low surface tension is used to improve a recording quality, or in a case where ink containing solvent with a high volatility is used for a high speed recording, distortion may be generated easily due to stress. For this reason, if such ink is used for a long time, even in a case where the measure discussed in Japanese Patent Application Laid-open No. 2003-80717 is taken against the peeling, the peeling may occur at an interface between the substrate and the flow path forming member. When the peeling between the substrate and the flow path forming member occurs, for example, the pressure generated by bubbling is not efficiently transmitted to the ink, so that a discharge amount of ink varies.

For this reason, especially in the field of commercial printing in which printing is performed on expensive media in many cases, there is a demand to detect the peeling of the flow path forming member from the substrate before affecting the recording products, and to replace the liquid discharge head. However, the technique discussed in Japanese Patent Application Laid-open No. 2003-80717 cannot detect the peeling of the flow path forming member.

SUMMARY

The present disclosure is directed to a liquid discharge apparatus capable of detecting a peeling of a flow path forming member.

According to an aspect of the present disclosure, a liquid discharge apparatus includes a substrate, a discharge port configured to discharge ink, a flow path forming member formed on the substrate and in which a flow path configured to supply liquid to the discharge port is formed, a detection unit arranged between the substrate and the flow path forming member and formed of a material of which an electrical resistance value changes by contacting the liquid, and a measurement unit configured to measure the electrical resistance value of the detection unit.

Further features of the present disclosure will become apparent from the following description of exemplary embodiments with reference to the attached drawings.

DESCRIPTION OF THE EMBODIMENTS

In the present disclosure, a description is given of an ink-jet recording apparatus (hereinbelow, referred to as a recording apparatus) that performs recording by discharging ink to a recording medium, as an example of a liquid discharge apparatus.

<Liquid Discharge Apparatus>

Figure 1:
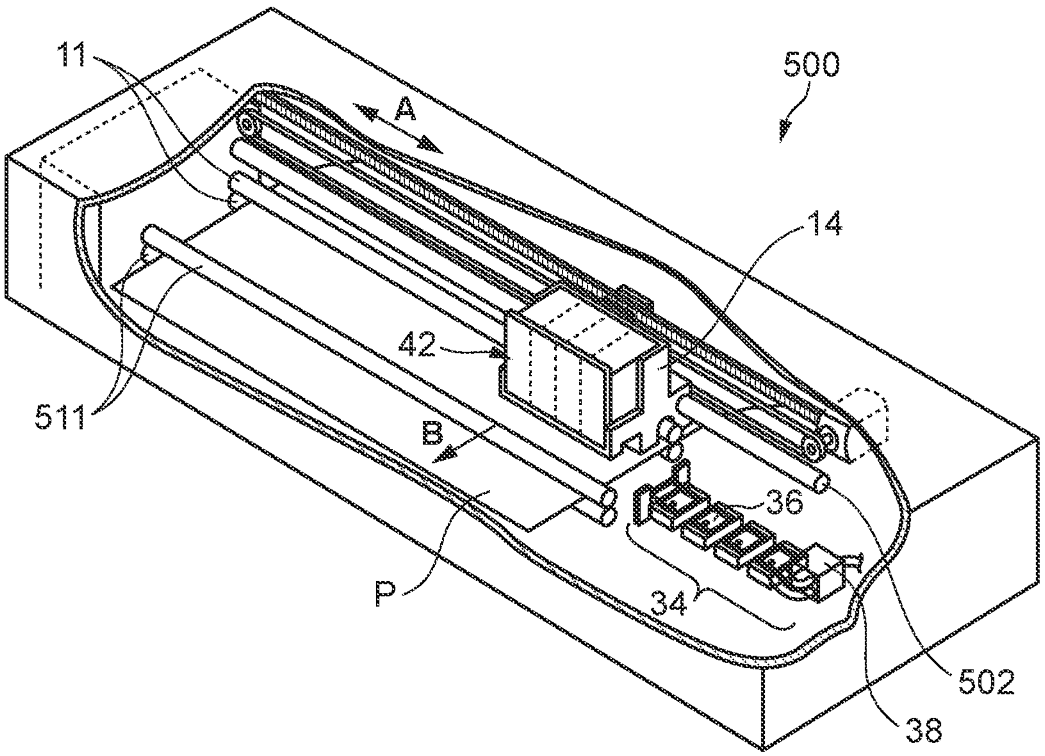
FIG. 1 is a schematic diagram of a liquid discharge apparatus according to an embodiment or portion of an embodiment of the subject disclosure.
Figure 2:
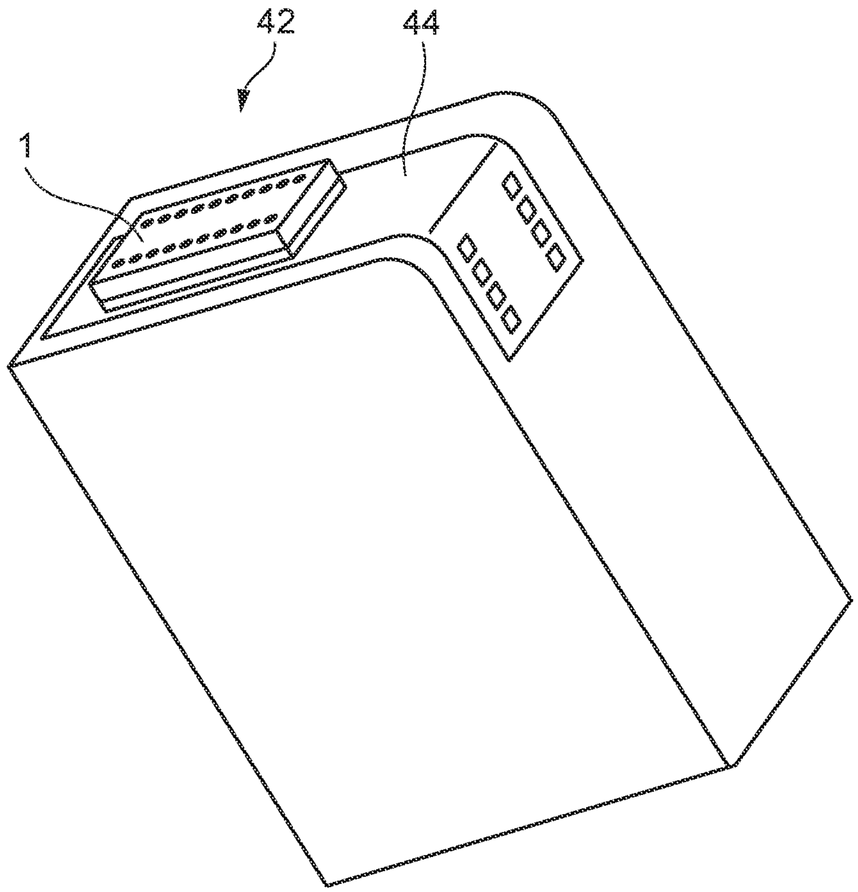
FIG. 2 is a perspective view of a liquid discharge head according to an embodiment or portion of an embodiment of the subject disclosure.
Figure 3:
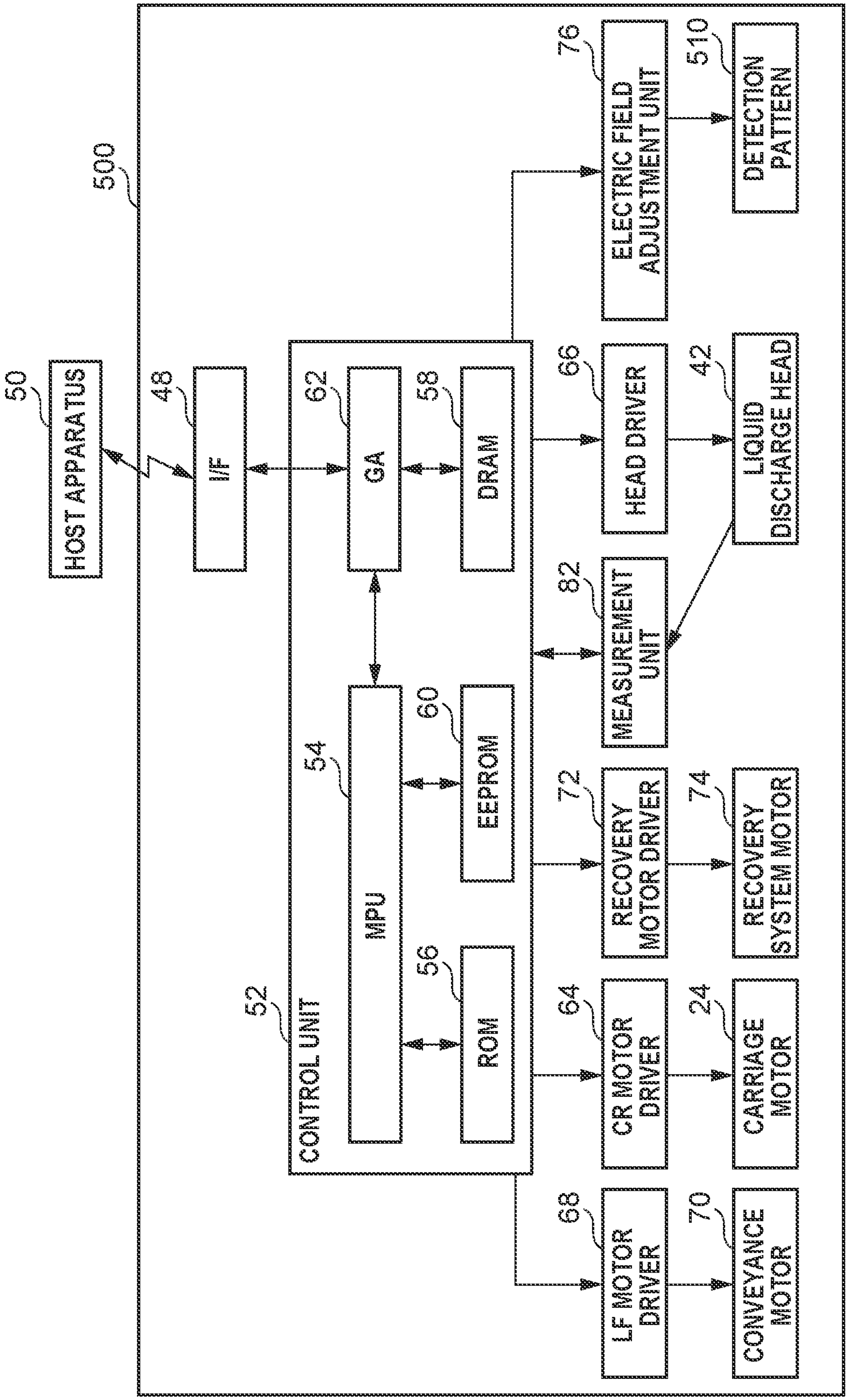
FIG. 3 is a block diagram illustrating a configuration of a control system of the liquid discharge apparatus according to an embodiment or portion of an embodiment of the subject disclosure.

FIG. 1 is a schematic diagram illustrating a recording apparatus (liquid discharge apparatus) 500. FIG. 2 is a schematic diagram illustrating a liquid discharge head 42 illustrated in FIG. 1. FIG. 3 is a block diagram illustrating a configuration of a control system of the recording apparatus 500.

The recording apparatus 500 includes a carriage 14, to which the liquid discharge heads 42 are attachable and from which the liquid discharge heads 42 are detachable. The carriage 14 moves in an arrow A direction while being supported by a guide shaft 502. The liquid discharge heads 42 also move in the A direction along with the movement of the carriage 14. The recording apparatus 500 includes conveyance rollers 11 and conveyance rollers 511. The conveyance rollers 11 and the conveyance rollers 511 are rotated by a conveyance motor 70 (see FIG. 3), to convey a recording medium P in an arrow B direction.

In the recording apparatus 500, a control unit 52 performs a recording operation of discharging ink to the recording medium P according to recording data while driving a carriage motor 24 (FIG. 3). In this way, an image corresponding to one band is recorded on the recording medium P. Then, the control unit 52 drives the conveyance motor 70 to perform a conveyance operation to convey the recording medium P in the arrow B direction for a distance corresponding to one band. The recording apparatus 500 forms a recording image on the recording medium P by alternately repeating the recording operation and the conveyance operation in this way.

Further, the recording apparatus 500 includes a recovery unit 34 for performing maintenance of the liquid discharge heads 42 at a home position located at one end in the A direction. The recovery unit 34 includes cap members 36 for protecting the liquid discharge heads 42 and a pump 38 for generating negative pressure in the cap members 36 by suction. The four liquid discharge heads 42 are provided on the carriage 14 and respectively can discharge cyan, magenta, yellow, and black inks. An electric wiring member 44 is attached to each of the liquid discharge heads 42 to supply recording data and power.

<Control System>

Next, with reference to FIG. 3, a control system of the recording apparatus 500 will be described. The recording apparatus 500 is connected to a host apparatus 50, which is provided separately, via an interface (I/F) 48. The recording apparatus 500 transmits and receives various kinds of information to and from the host apparatus 50 via the I/F 48. More specifically, the recording apparatus 500 receives, for example, a recording command and image data from the host apparatus 50, and transmits, for example, status information of the recording apparatus 500 to the host apparatus 50, via the I/F 48. As the host apparatus 50, a known apparatus such as a digital camera, a scanner, and a mobile terminal, in addition to a general-purpose personal computer (PC) can be used. When a recording command is generated on the host apparatus 50, the recording command is input to the recording apparatus 500 together with the image data, via the I/F 48.

The control unit 52 controls operation of the entire recording apparatus 500. The control unit 52 includes a micro processing unit (MPU) 54, a read-only memory (ROM) 56, a dynamic random access memory (DRAM) 58, an electrically erasable programmable ROM (EEPROM) 60, and a gate array (GA) 62. The EEPROM 60 is a memory for storing various kinds of information necessary for the recording apparatus 500 when the power is turned ON next time, even in a state where the power is turned OFF. Further, the GA 62 controls the data transfer with the I/F 48 based on an instruction of the MPU 54.

The MPU 54 executes various kinds of processing according to programs and parameters stored in the ROM 56 using the DRAM 58 as a work area. For example, the MPU 54 drives the carriage motor 24 via a CR motor driver 64 connected to the control unit 52, to move the carriage 14 in the A direction. In the recording operation, at this time, the MPU 54 transfers the recording data from the DRAM 58 to each of the liquid discharge heads 42 via a head driver 66 connected to the control unit 52, and causes each of the liquid discharge heads 42 to record an image corresponding to one band.

Further, the MPU 54 drives the conveyance motor 70 via a line feed (LF) motor driver 68 connected to the control unit 52, to convey the recording medium P for a predetermined distance in the B direction by the conveyance rollers 11 and 511, each time the image corresponding to one band is recorded. The image data received from the host apparatus 50 is recorded on the recording medium P, by the MPU 54 alternately repeating the recording operation by controlling the carriage motor 24 and each of the liquid discharge heads 42, and the conveyance operation by controlling the conveyance rollers 11 and 511.

Further, at a timing, for example, after the image recording corresponding to one page is completed, the MPU 54 drives a recovery system motor 74 via a recovery motor driver 72 connected to the control unit 52 to execute suction recovery processing with respect to each of the liquid discharge heads 42. More specifically, the recovery system motor 74 includes a motor for driving the pump 38, and a motor, for example, for lifting and lowering each of the cap members 36.

Further, the MPU 54 executes a potential adjustment of a detection pattern (also referred to as a detection unit) 510 provided on each of the liquid discharge heads 42, via an electric field adjustment unit 76 connected to the control unit 52. Further, a measurement unit 82 (measurement unit 82-1) measures a resistance value in a circuit including an electrode or the detection pattern as a part of the wiring in each of the liquid discharge heads 42, and outputs the measurement result to the control unit 52. The detection pattern 510 will be described below.

The ROM 56 stores various parameters used by the MPU 54 to perform various controls. Examples of the parameters include a shape of a voltage pulse applied to heating resistance elements of each of the liquid discharge heads 42, a conveyance speed of the recording medium P, and a moving speed of the carriage 14.

<Configuration of Liquid Discharge Head>

Figure 4A:
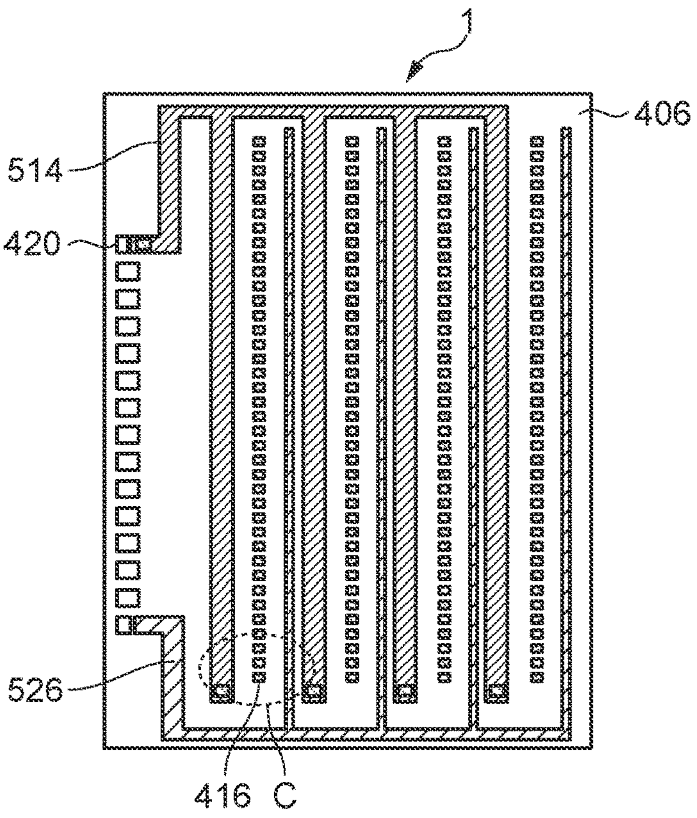
FIGS. 4A, 4B, and 4C are schematic diagrams of a recording element substrate according to an embodiment or portion of an embodiment of the subject disclosure.
Figure 4B:
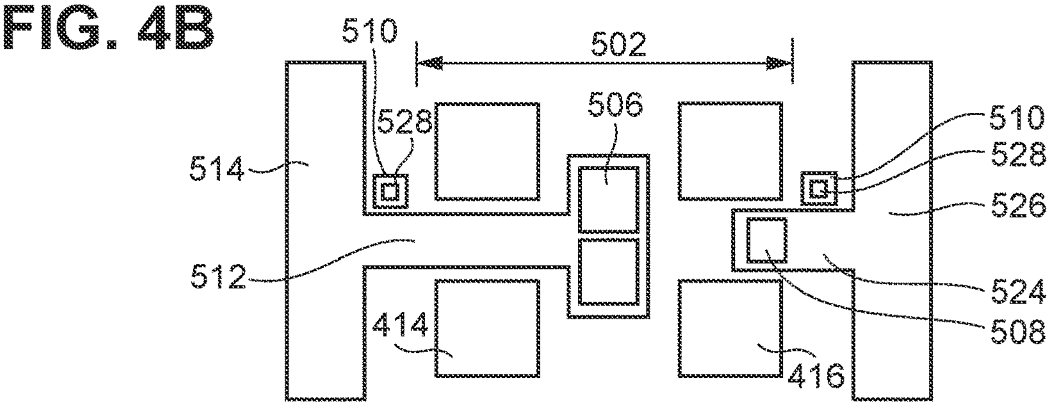

Next, a configuration of each of the liquid discharge heads 42 will be described. The configurations of the liquid discharge heads 42 are similar to each other, so that the configuration of one liquid discharge head 42 will be described. FIG. 4A is a plan view schematically illustrating a recording element substrate 1. Each of FIGS. 4B and 4C is an enlarged diagram of FIG. 4A in a frame C.

Figure 4C:
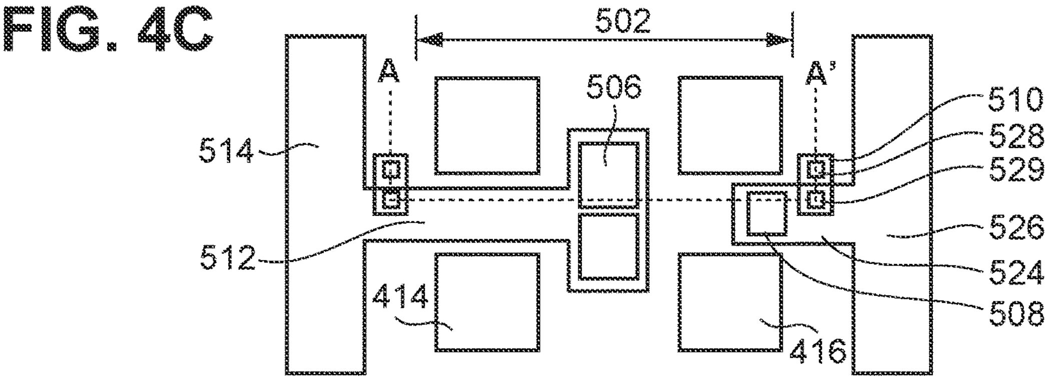
Figure 5:
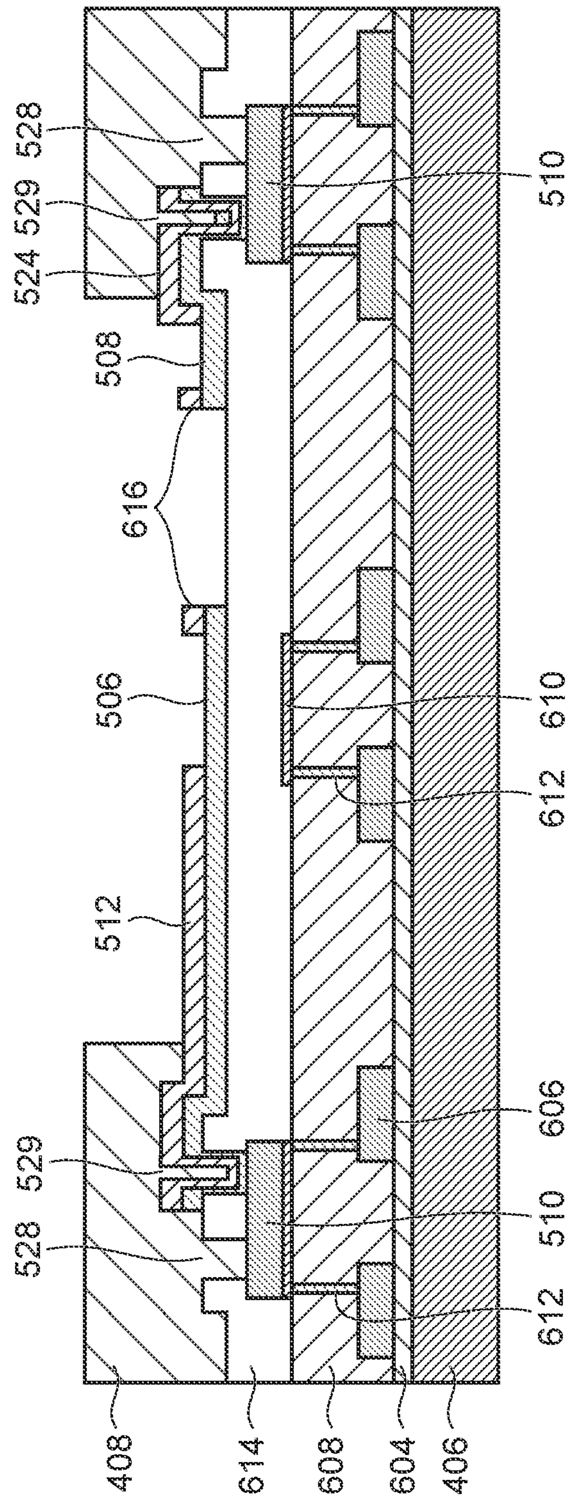
FIG. 5 is a cross-section diagram taken along a plane corresponding to a line A-A' illustrated in FIG. 4C according to an embodiment or portion of an embodiment of the subject disclosure.

FIG. 5 is a cross-section diagram taken along a plane corresponding to a line A-A' illustrated in FIG. 4C.

Each of the liquid discharge heads 42 is provided with a substrate 406 on which ink supply ports 414 for supplying ink to respective pressure chambers 502 (FIG. 6), and ink recovery ports 416 for recovering ink from the pressure chambers 502 are formed. On one side of the substrate 406, a flow path forming member 408 is formed in which flow paths for supplying ink to respective pressure chambers 502 are formed.

The ink supply ports 414 and the ink recovery ports 416 are arranged along an extending direction of a discharge port array in the flow path forming member 408.

Figure 6:
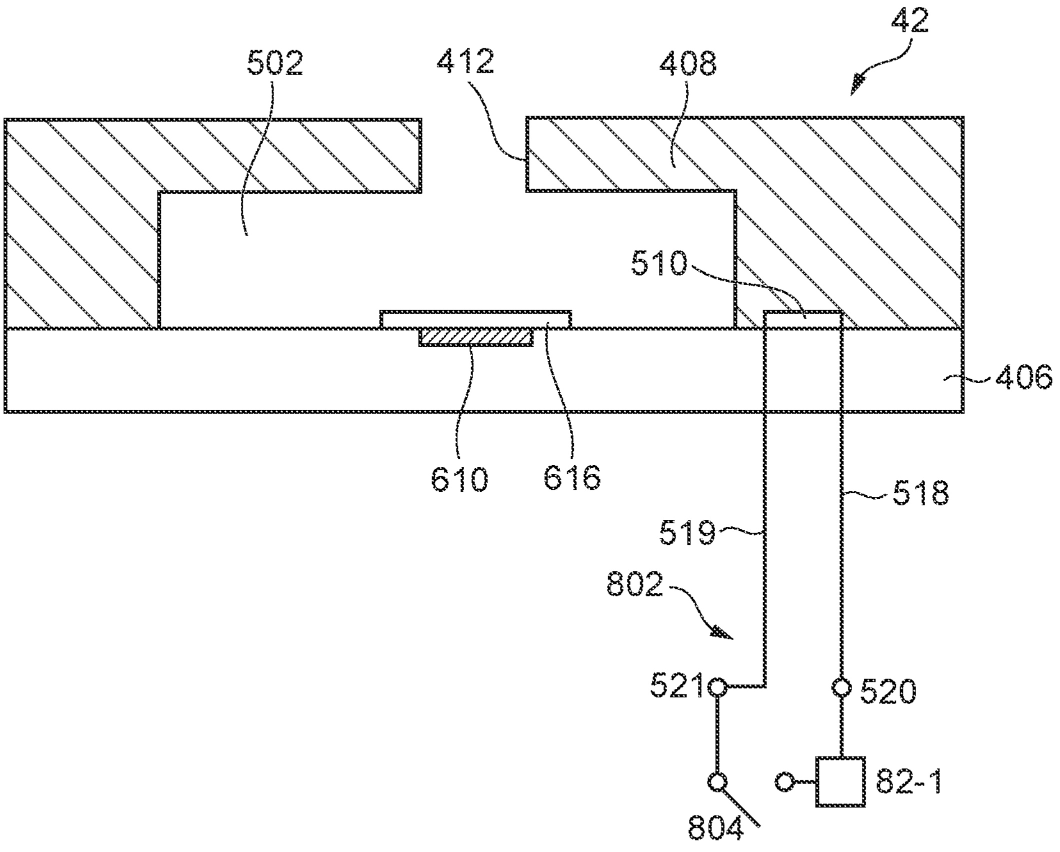
FIG. 6 is a diagram illustrating a circuit configuration of a detection pattern according to an embodiment or portion of an embodiment of the subject disclosure.

On the one side of the substrate 406, a thermal action unit is formed at a position corresponding to each of the discharge ports 412 (see FIG. 6). The thermal action unit is for bubbling ink by heat energy. The thermal action unit includes a recording element (hereinbelow, also referred to as a "heating resistance element" or "heating element") 610 (see FIG. 6) for performing recording by discharging ink, and an upper protective layer (hereinbelow, also referred to simply as a protective layer) 506 for protecting the heating resistance element 610. The thermal action unit is located in the pressure chamber 502 formed in the flow path forming member 408. The upper protective layer 506 is formed on an insulation layer 614.

Further, on the one side of the substrate 406, a terminal 420 electrically connected to each of the heating resistance elements 610 by an electrical wiring (not illustrated) provided on the substrate 406 is formed. In this way, the heating resistance element 610 is heated based on a pulse signal input via an external wiring substrate (not illustrated), to boil the ink in the pressure chamber 502. Ink is discharged through the discharge port 412 by the force of bubbling generated due to the boiling.

The upper protective layer 506 is provided so as to contact ink at a position above the heating resistance element 610 in the pressure chamber 502. When ink is discharged, cavitation occurs due to the instantaneous ink temperature rise in an upper area of the upper protective layer 506. For this reason, the upper protective layer 506 is formed with a material having a high corrosion resistance and a high reliability. Examples of the material for the upper protective layer 506 include a platinum group metal such as iridium (Jr) or ruthenium (Ru), or tantalum (Ta).

Under the flow path forming member 408 forming the pressure chamber 502, the detection patterns (hereinbelow, also referred to as a detection units) 510 is provided. Further, wirings are connected to the two end portions of the detection pattern 510, i.e., to the different terminals, and the wiring resistance value including the detection pattern 510 can be measured with this configuration. The detection pattern 510 is provided with an opening 528. If the detection pattern 510 is damaged by the ink entering through the opening 528 due to the peeling between the flow path forming member 408 and the substrate 406, since the wiring resistance value including the detection pattern 510 increases, the peeling and the entering of the ink can be detected.

The detection pattern 510 is made of a material the electrical resistance value of which can easily change by the contact with ink. For example, the material can be selected from the materials having a corrosion range with respect to the pH of the ink based on an electrical potential-pH diagram. For example, in a case of mildly alkaline ink, the material can be selected from among nickel (Ni), tungsten (W), germanium (Ge), zinc (Zn), chromium (Cr), manganese (Mn), and aluminum (Al). In this way, the detection pattern 510 is formed with a material containing a metal that causes an electrochemical reaction by contacting the liquid.

<Arrangement Position of Detection Pattern>

The detection pattern 510 may be arranged at any position as long as it is arranged under the flow path forming member 408 on the substrate 406. However, to detect the peeling as soon as possible, it is preferable to arrange the detection pattern 510 at a position closer to the pressure chamber 502. Further, the detection pattern 510 may be arranged independently at a position at which stress-strain tends to occur most, or a plurality of the detection patterns 510 may be arranged over the entire substrate 406 to detect an unintended peeling at a time of a sudden abnormality.

Further, the detection pattern 510 may be arranged under the flow path forming member 408 in a direction orthogonal to the array direction in which the heating resistance elements 610 are arranged, or under the flow path forming member 408 at the end portion in the array direction in which the heating resistance elements 610 are arranged. Further, the detection pattern 510 may be arranged under the flow path forming member 408 between the heating resistance elements 610.

<Wiring of Detection Pattern>

A first individual wiring 518 for detection is connected between one end portion of the detection pattern 510 and a terminal 520. A second individual wiring 519 for detection is connected between the other end portion of the detection pattern 510 and a terminal 521. Accordingly, the terminal 520 and the terminal 521 are connected via the detection pattern 510. In the circuit formed in this way, the measurement unit 82-1 capable of measuring the wiring resistance value is provided.

In the case where a plurality of the detection patterns 510 is arranged, it is possible to perform wiring so as to be able to measure the series resistance formed by connecting the plurality of detection patterns 510 in series. In this case, it is possible to effectively detect the peeling with a smaller number of terminals, because the resistance value increases if the peeling occurs even at one position.

<Use of Battery Effect>

It is possible to detect the peeling at an earlier timing by forming the detection pattern 510 with a less noble metal material (metal material that is more easily ionized) than that of the upper protective layer 506 of the pressure chamber 502, and electrically connecting the detection pattern 510 and the upper protective layer 506. More specifically, in such the configuration, when ink from the pressure chamber 502 enters the metal on the detection pattern 510 due to peeling, a battery is formed between the detection pattern 510, the upper protective layer 506, and the ink. Since the material of the detection pattern 510 is less noble, the corrosion reaction of the detection pattern 510 tends to be accelerated. Thus, the corrosion reaction of the detection pattern 510 tends to appear as an increase in the resistance value. As a combination of such materials, for example, a combination of a material containing Al for the detection pattern 510, and a material containing a platinum group such as Jr or Ta for the upper protective layer 506 can be suitably used.

<Area Ratio>

In the configuration in which the detection pattern 510 and the upper protective layer 506 are connected as described above, it is possible to detect the peeling earlier by increasing the area ratio of the upper protective layer 506 connected to the detection pattern 510. More specifically, when ink enters, if an area of the detection pattern 510 contacting the ink is smaller than that of the upper protective layer 506 contacting the ink, the current density flowing through the detection pattern 510 increases, and as a result, it is possible to increase the corrosion speed of the detection pattern 510. Thus, it is possible to detect a minute ink intrusion.

<Kogation Control>

As a recent liquid discharge head, a configuration that keeps the discharge performance stable for a long time, by using the upper protective layer 506 as an upper electrode (first electrode) (hereinbelow, also referred to as an upper electrode 506), providing an opposing electrode (second electrode) 508 in the same liquid chamber of the upper protective layer 506, and applying a voltage between the electrodes, is discussed. In such the ink jet head, the detection pattern 510 may be electrically connected to the upper electrode 506 or the opposing electrode 508 (See FIG. 4C).

In the configuration described above, the upper electrode 506 is formed of a material that can be eluted in the ink by an electrochemical reaction. In this way, the upper electrode 506 is provided above the heating resistance element 610 on the substrate 406 on the side in contact with the ink. Further, in the pressure chamber 502, the opposing electrode (second electrode) 508 is provided corresponding to the upper electrode (first electrode) 506. In addition, the opposing electrode 508 is an electrode for causing an electrochemical reaction between the upper electrode 506 and the ink to occur, to elute the upper electrode 506 into the ink.

Further, the upper electrode 506 is connected to the terminal 420 (see FIG. 4A) via a common wiring 514 for the upper electrodes 506, and a voltage is applied from the outside via the terminal 420. Further, the opposing electrode 508 is connected to the terminal 420 (see FIG. 4C) via a common wiring 526 for the opposing electrode 508, and a voltage is applied from the outside via a terminal 420. In this way, a voltage can be applied between the upper electrode 506 and the opposing electrode 508 via the ink in the pressure chamber 502.

In this configuration, in a case where the detection pattern 510 and the upper electrode 506 are connected, the common wiring 514 for the upper electrode 506 and the terminal 420 can be used as a wiring for measuring the wiring resistance value of the detection pattern 510. Further, in a case where the detection pattern 510 and the opposing electrode 508 are connected, the common wiring 526 for the opposing electrode 508 and the terminal 528 can be used as a wiring for measuring the wiring resistance value of the detection pattern 510.

<Layered Structure>

Next, the layered structure of the heating resistance element 610 and the detection pattern 510 on the substrate 406 will be described. In the present exemplary embodiment, a configuration including the upper electrode 506 and the opposing electrode 508 will be described, but this configuration is not necessarily essential.

FIG. 5 is a cross-section diagram illustrating the liquid discharge head 42 in which the flow path forming member 408 is formed, taken along a plane corresponding to a line A-A' illustrated in FIG. 4C. To facilitate understanding, wiring are not illustrated, but the heating resistance element 610, the detection pattern 510, the upper electrode 506, and the opposing electrode 508, provided on the substrate, are electrically connected to the wiring to obtain power used for the heating, the peeling detection, and cleaning processing for suppressing and removing the kogation.

The insulation layer 614 formed of silicon nitride (SiN) is provided on the heating resistance element 610 to prevent the heating resistance element 610 from contacting the liquid. Further, on the upper surface of an insulation layer 604, a first wiring pattern 606 composed of an alloy of aluminum and copper is provided. The first wiring pattern 606 includes a wiring for supplying a voltage to the heating resistance element 610, and a wiring for measuring the resistance value of the detection pattern 510.

The first wiring pattern 606 is covered by an insulation layer 608 formed of silicon oxide (SiO) or the like. The insulation layer 608 is provided with a plug 613 for connecting the first wiring pattern 606 and the heating resistance element 610, and a plug 612 for connecting the first wiring pattern 606 and the detection pattern 510. Tungsten or the like can be used as a material for the plugs 612. Further, the upper surface of the insulation layer 608 is a surface planarized using a Chemical Mechanical Polishing (CMP) method.

On the upper surface of the insulation layer 608, the heating resistance element 610 is provided. The heating resistance element 610 is provided with a heat generating resistive element layer composed of tantalum silicon nitride (TaSiN) or the like. The plug 612 is connected to the heat generating resistive element layer. Thus, in the heat generating resistive element layer, the portion through which current flows via the plug 612 functions as the heating resistance element 610.

The plug 612 is connected to the detection pattern 510, and is a part of the wiring when the resistance value of the detection pattern is measured.

Further, on the upper surface of the insulation layer 608, a second wiring pattern and the detection pattern 510 formed of an alloy of aluminum and copper are formed. It is of no matter that a layer of TaSiN remains under the second wiring pattern and the detection pattern 510.

In the present exemplary embodiment, the detection pattern 510 is formed of the same layer, the same material, and through the same manufacturing process as those of the second wiring pattern, but the detection pattern 510 may be formed of a different material. The heating resistance element 610, the second wiring pattern, and the detection pattern 510 are covered by the insulation layer 614, for example, with a thickness of 200 nm and made of SiN.

<Upper Electrode and Opposing Electrode>

A protective layer 616 is proved on the upper surface of the insulation layer 614. The protective layer 616 has a two-layer structure formed of, for example, an iridium (Jr) layer with a thickness of 30 nm (coarsely hatched layer in FIG. 5), and a tantalum (Ta) layer with a thickness of 60 nm (finely hatched layer in FIG. 5), in this order from the insulation layer 614 side. In addition, at a portion covering the area of the protective layer 616 where the heating resistance element 610 is positioned, the iridium layer is exposed to the pressure chamber 502 by removing the tantalum layer (i.e., upper layer). In addition, the exposed iridium layer functions as the upper electrode 506. The heating resistance element 610 and the protective layer 616 are electrically insulated by the insulation layer 614.

Further, on the upper surface side of the insulation layer 614, an individual wiring 512 and a common wiring 524 are provided.

The individual wiring 512 and the common wiring 524 may be formed as one layer using the same material as the protective layer 616.

Further, on the upper surface of the insulation layer 614, the opposing electrode 508 is provided at a distance to the upper electrode 506 in a direction intersecting the array direction of the upper electrodes 506. Similar to the upper electrode 506, the opposing electrode 508 has a two layer-structure formed by layering an iridium layer with a thickness of 30 nm and a tantalum layer with a thickness of 60 nm, and the iridium layer is exposed to the pressure chamber 502 by removing a part of the tantalum layer (i.e., upper layer). In the present exemplary embodiment, the opposing electrode 508 is formed of the same layer as the upper electrode 506.

Further, the individual wiring 512 and the common wiring 526 are formed with the same layer as the upper electrode 506, the individual wiring 512, and the common wiring 514. The common wiring 514 and the common wiring 526 has the same structure as the protective layer 616, but wiring can be made using the second wiring pattern, by making an opening in the insulation layer 614 and connecting to the second wiring pattern.

<Use of Battery Effect>

As illustrated in FIG. 5, in the case where the protective layer 616 and the detection pattern 510 are conducted, in a process before forming the protective layer 616, a through-hole is made in a part of the insulation layer 614 on the detection pattern 510 and a connection portion 529 is provided. The protective layer 616 and the detection pattern 510 can be electrically connected, by forming the upper protective layer 506 on the connection portion 529.

<PV>

Further, the insulation layer 614 is opened in a part of the area on the upper surface side of the detection pattern 510, and the opening 528 is formed so that the detection pattern 510 and the flow path forming member 408 are layered at the opening. The ink entering the opening 528 due to the peeling of the flow path forming member 408 erodes the detection pattern 510.

Next, the detection pattern 510 will be described. FIG. 6 is a diagram illustrating a circuit configuration of the detection pattern 510. In FIG. 6, to facilitate understanding, a part of the configuration on the substrate 406 is omitted. The individual wirings 518 and 519 are connected to respective ends of the detection pattern 510. The detection pattern 510 functions as a part of the wiring and configures a circuit 802 together with the first individual wiring 518 and the second individual wiring 519. The switch 804 is provided in the circuit 802, and a closed circuit is formed by closing the switch 804. In the circuit 802, the measurement unit 82-1 capable of measuring the wiring resistance value is provided together with the switch 804 between the terminal 521 for the individual wiring 519 and the terminal 520 for the individual wiring 518.

If the flow path forming member 408 is caused to peel and ink enters the detection pattern 510 along with the increase of the number of printing pulses, the control unit 52 determines that a part of the circuit 802 has been damaged and led to increase in the resistance value, i.e., the peeling has occurred, based on the measurement result by the measurement unit 82-1. In this way, the control unit 52 can detect the timing at which the nozzle peeling has been caused, based on the measurement result of the measurement unit 82-1.

In addition, in the present exemplary embodiment, the measurement unit 82 (measurement unit 82-1) as a measurement means is provided outside the liquid discharge head 42, but at least a part of the measurement unit 82 may be provided in the liquid discharge head 42.

<Recording Processing>

Figure 7:
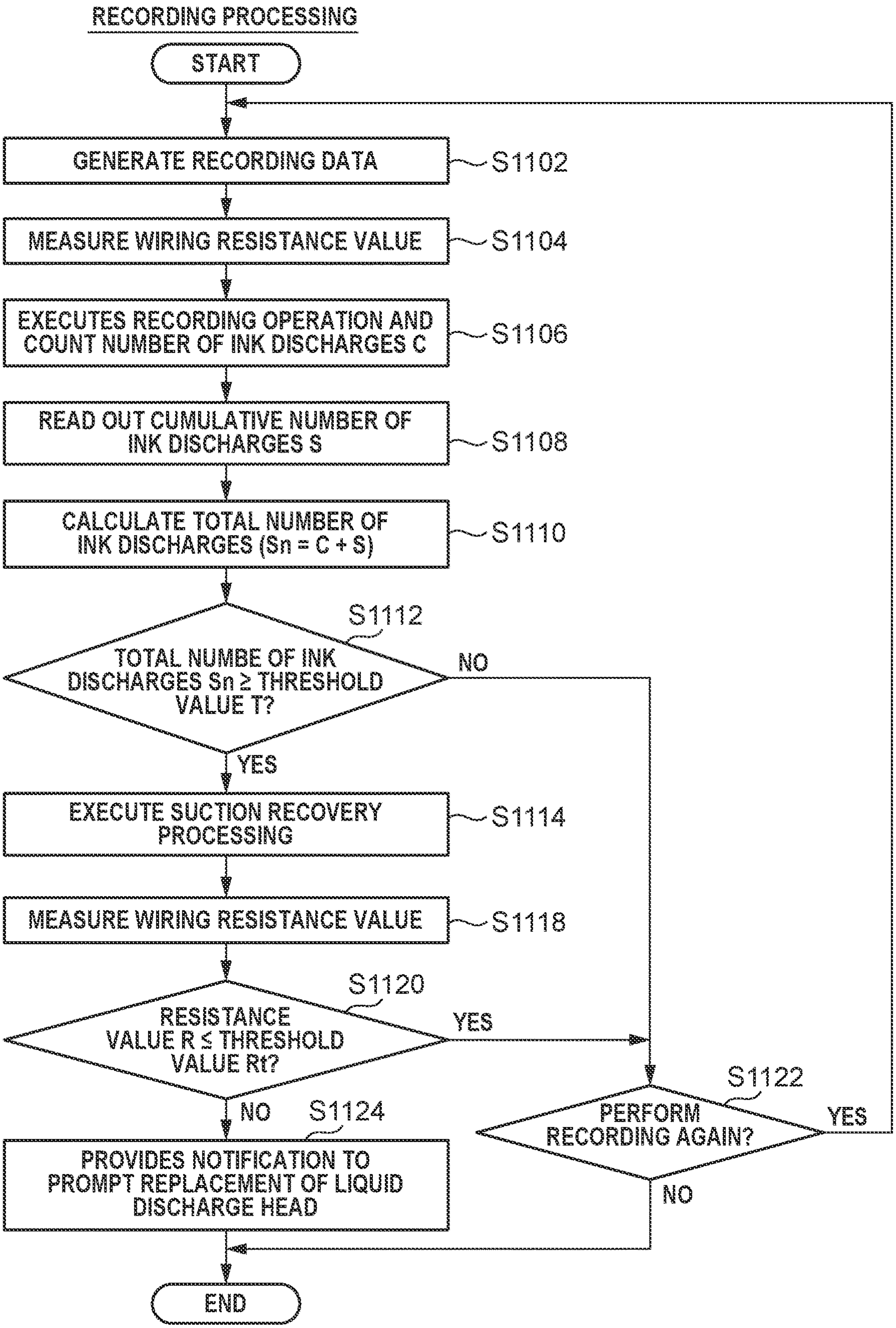
FIG. 7 is a flowchart illustrating processing contents of recording processing according to an embodiment or portion of an embodiment of the subject disclosure.

In the above-described recording apparatus 500, when a recording command is input from the host apparatus 50 or the like, the recording processing is executed. FIG. 7 is a flowchart illustrating detailed contents of the recording processing. The series of processing illustrated in the flowchart of FIG. 7 is executed by the MPU 54 in the control unit 52 loading a program code stored in the ROM 56 into the DRAM 58 and executing the loaded program code. Alternatively, a part of or all of functions of steps in FIG. 7 may be implemented by hardware such as an application specific integrated circuit (ASIC) or an electric circuit.

When the recording processing starts, first, the MPU 54 rasterizes, in the DRAM 58 via the GA 62, image data input from the host apparatus 50 via the I/F 48. Then, in step S1102, MPU 54 generates recording data for controlling whether to discharge or not discharge ink.

Next, in step S1104, the MPU 54 measures the wiring resistance value of a first circuit 802. More specifically, in step S1104, the MPU 54 closes the switch 804 via the electric field adjustment unit 76 in the first circuit 802 to measure the wiring resistance value by the measurement unit 82-1. This value is defined as an initial wiring resistance value Rini.

Then, in step S1106, the MPU 54 executes a recording operation and a conveyance operation based on the recording data, and starts counting the number of ink discharges C discharged by the liquid discharge head 42 during the recording operation. In step S1108, the MPU 54 reads out a cumulative number of ink discharges S stored in the DRAM 58 at a timing of, for example, completing a predetermined amount of recording operation. The cumulative number of ink discharges S is a total count of the number of discharges of the liquid discharge head 42. The cumulative number of ink discharges S is initialized at a replacement timing of the liquid discharge head 42. Then, in step S1110, the MPU 54 adds the cumulative number of ink discharges S and the number of ink discharges C counted during the recording operation, and obtains a total number of ink discharges Sn. In addition, in step S1110, the MPU 54 further updates the value of the cumulative number of ink discharges S stored in the DRAM 58 to the value of the total number of ink discharges Sn.

Next, in step S1112, the MPU 54 determines whether the total number of ink discharges Sn updated in step S1110 is a threshold value T or larger. The threshold value T is, for example, an upper limit value of the number of discharges at which an unstable state of the ink discharge in the liquid discharge head 42 due to the peeling of the flow path forming member 408 does not occur, or smaller than the upper limit value by a predetermined value. The threshold value T can be experimentally obtained, for example, based on a type of ink used or a head temperature.

In step S1112, in a case where the MPU 54 determines that the total number of ink discharges Sn is smaller than the threshold value T (NO in step S1112), the processing proceeds to step S1122 to be described below. On the other hand, in step S1112, in a case where the MPU 54 determines that the total number of ink discharges Sn is the threshold value T or larger (YES in step S1112), the processing proceeds to step S1114. In step S1114, the MPU 54 executes the suction recovery processing. More specifically, in step S1114, the MPU 54 drives the carriage motor 24 via the CR motor driver 64 to move the carriage 14 to the home position. Then, the MPU 54 drives the recovery system motor 74 via the recovery motor driver 72 to bring the cap member 36 into contact with the liquid discharge head 42. Then, the MPU 54 reduces the pressure in the cap members 36 using the pump 38, to forcibly discharge the ink through the discharge port 412.

Next, in step S1118, the wiring resistance value of each of the first circuit 802 and a second circuit 806 is measured. More specifically, in step S1118, the MPU 54 measures the wiring resistance value by the measurement unit 82-1 via the electric field adjustment unit 76, by closing the switch 804 in the first circuit 802.

Then, in step S1120, the MPU 54 determines whether the resistance value R obtained in step S1118 is a threshold value Rt or smaller. The threshold value Rt is, for example, determined to be an upper limit value obtained by adding a measurement error value to the initial measurement value Rini.

In step S1120, when the MPU 54 determines that the resistance value R is the threshold value Rt or smaller (YES in step S1120), the processing proceeds to step S1122. In step S1122, the MPU 54 determines whether to perform recording again. In step S1122, when the MPU 54 determines that the recording is to be performed again (YES in step S1122), the processing returns to step S1102. In step S1122, when the MPU 54 determines that the recording is not to be performed again (NO in step S1122), the MPU 54 ends the recording processing. In other words, when the resistance value R is the threshold value Rt or smaller, the MPU 54 determines that the peeling of the flow path forming member 408 has not occurred, and the subsequent recording can be executed.

Further, in step S1120, when the MPU 54 determines that the resistance value R is larger than threshold value Rt (NO in step S1120), the processing proceeds to step S1124. In step S1124, the MPU 54 provides a notification to prompt the replacement of the liquid discharge head 42, and then ends the recording processing. In other words, the MPU 54 determines, when the resistance value R is not the threshold value Rt or smaller, i.e., exceeds the threshold value Rt, that the nozzle peeling has occurred and the function of normally discharging ink is lost, and prompts the replacement of the liquid discharge head 42.

In addition, the threshold value Rt may be set to a different value depending on the required discharge performance. In a case where even a little peeling affects the printing, the threshold value Rt is set to a value obtained by adding only a measurement tolerance to the initial resistance value Rini. On the other hand, in a case where a little peeling does not affect the printing, the threshold value Rt is set to a value obtained by adding a larger value to the initial resistance value Rini. These addition values can be experimentally obtained.

As described above, the present exemplary embodiment is configured in such a manner that the first circuit 802 including the detection pattern 510 is formed in the liquid discharge head 42, and the wiring resistance value can be measured in the first circuit 802.

In this way, it is possible to detect the timing at which the normal discharge function is lost in the liquid discharge head 42, i.e., the flow path forming member 408 peels from the substrate 406. Accordingly, it is possible to appropriately detect the replacement timing of the liquid discharge head 42, and to replace the liquid discharge head 42 at a more appropriate timing. Thus, the cost of failure caused by the defective printing can be reduced.

<Verification Experiments>

Next, verification experiments that the inventor of the present disclosure performed to confirm the effects of the present exemplary embodiments will be described. The recording apparatus 500 used for the verification experiments is configured in such a manner that a tank is attachable to and detachable from the liquid discharge head 42, and the liquid discharge head 42 is fixed to the carriage 14. Further, as ink, a pigment cyan ink is used.

Verification Example 1

<Configuration of Liquid Discharge Head>

In a verification example 1, a tantalum layer with a thickness of 200 nm is formed and patterned as the protective layer 616 on the insulation layer 614 of the substrate 406. Each of the detection patterns 510 is provided using the second wiring material in an area where the flow path forming member 408 is arranged between the heating resistance elements 610. By opening the protective layer 616 above the detection pattern 510, and opening the insulation layer 614 inside the protective layer 616, the detection pattern 510 and the flow path forming member 408 are brought into contact with each other.

All the detection patterns 510 are connected in series by the plugs and the first wiring layers, and the wiring resistance value is measurable by the measurement unit 82-1 in the circuit 802 including the detection patterns 510 as a part of the wiring. The liquid discharge head 42 is produced by forming other required terminals and the like. In the present exemplary embodiment, the detection patterns 510 and the protective layer 616 are not connected.

<Print Endurance>

First, the switch 804 was closed, and the wiring resistance value of the circuit 802 was measured using the measurement unit 82-1. A value obtained by adding the measurement tolerance to the measured initial value is defined as a threshold value Rt. Then, the liquid discharge head 42 was caused to discharge ink "$1\times10^7$" times. During the discharge operation, the liquid discharge head 42 was adjusted to be 40 degrees C. in temperature. It was confirmed that the resistance value R, which was obtained by closing the switch 804 and measuring the wiring resistance value of the first circuit 802 with the measurement unit 82-1, is the threshold value Rt or smaller.

Then, the operation of performing the discharge operation "$1\times10^7$" times and then measuring the wiring resistance value was repeated. Then, in the wiring resistance value measurement performed after completing the total of "$1\times10^9$" time operations, the result of the wiring resistance value measurement showed that the resistance value R had exceeded the threshold value Rt. When the observation was performed using a metallographic microscope, a part of the detection patterns 510 was corroded, and thus it was proved that ink had entered under the flow path forming member 408 layered on the detection patterns 51. The print quality check was performed with this head in this state, any problem was not found in the print quality.

Then, when the discharge operation of "$1\times10^7$" times was additionally performed, the resistance value R was measured. At that time, the wiring resistance value had further increased. When the print quality check was performed using this head, blur was found in a part of the print.

Thereafter, the experiment was performed using another head with the same conditions, and in the wiring resistance value measurement after the total of "$1\times10^9$" discharge operations, it was found that the resistance value R showed a larger value than the threshold value Rt. When the cross-section was observed, it was found that a floating of approximately 2 um had occurred between the substrate 406 and flow path forming member 408.

Verification Example 2

<Configuration of Liquid Discharge Head>

In a verification example 2, after forming an iridium layer of 30 nm as the protective layer 616 on the insulation layer 614 in the substrate 406, patterning was performed. Then, a tantalum layer of 60 nm was formed on the iridium layer and patterning was performed. The upper electrodes 506 and the opposing electrodes 508 are formed on the substrate 406 with the protective layer 616 formed in this way, and the wirings for applying voltage between the upper electrodes 506 and the opposing electrodes 508 are formed by the protective layer 616. The tantalum layer was opened so that the exposed area of the iridium layer on each of the upper electrodes 506 was larger than the exposed area of the iridium layer on each of the opposing electrodes 508.

The detection patterns 510 were arranged under the flow path forming member 408 in a direction orthogonal to the array direction of the discharge port array. The detection patterns 510 are arranged one on the right side and one on the left side of the two discharge ports. All the detection patterns 510 were connected in series, and the resistance value thereof was made measurable via the terminal 520 and the terminal 521. Further, each area of the detection pattern 510 contacting the flow path forming member 408 is made to have a shape of "5 um×5 um".

By opening a part of the insulation layer 614 on the upper portion of the detection pattern 510 before forming a film of the protective layer 616, each of the detection patterns 510 and the protective layer 616 were electrically connected. By the patterning performed thereafter, a pattern conducting to each of the opposing electrodes 508 was formed to conduct all the detection patterns 510 in the array and all the opposing electrodes 508 in the array.

<Print Endurance>

First, the switch 804 was closed, and the wiring resistance value of the circuit 802 was measured using the measurement unit 82-1. A value obtained by adding the measurement tolerance to the initial value is defined as a threshold value Rt. Then, the liquid discharge head 42 was caused to discharge ink "$1\times10^{8}$" times. During the discharge operation, the liquid discharge head 42 was adjusted to be 40 degrees C. in temperature. It was confirmed that the resistance value R, which was obtained by closing the switch 804 and measuring the wiring resistance value of the first circuit 802 with the measurement unit 82-1, is the threshold value Rt or smaller.

Then, the operation of performing the discharge operation "$1\times10^{8}$" times and then measuring the wiring resistance value was repeated. In this case, in the measurement performed after completing the total of "$5\times10^{9}$" time operations, the result of the wiring resistance value measurement showed that the resistance value R had exceeded the threshold value Rt.

When the observation was performed using a metallographic microscope, it was observed that ink had entered under the flow path forming member 408, and a part of the detection patterns 510 was corroded. However, when a print check was performed, a good print was obtained. Thus, it was found that the floating was a level of the floating of the flow path forming member 408 that did not affect the printing. When a cross-section observation was performed, it was observed that the flow path forming member 408 had floated from the substrate 406 by approximately 0.5 um.

Verification Example 3

<Configuration of Liquid Discharge Head>

In a verification example 3, a liquid discharge head was the same as that used in the verification example 2 except that all the detection patterns 510 and all the upper electrodes 506 in the array were conducted with each other.

<Print Endurance>

First, the switch 804 was closed, and the wiring resistance value of the circuit 802 was measured using the measurement unit 82-1. A value obtained by adding the measurement tolerance to the measured initial value is defined as a threshold value Rt. Then, the liquid discharge head 42 was caused to discharge ink "$1\times10^{8}$" times, and confirmed that the resistance value R was the threshold value Rt or smaller. Then, the operation of performing the discharge operation "$1\times10^{8}$" times and then measuring the wiring resistance value was repeated. In this case, in the wiring resistance value measurement performed after completing the total of "$4.9\times10^{9}$" time operations, the result of the wiring resistance value measurement showed that the resistance value R had exceeded the threshold value Rt.

When an observation was performed using a metallographic microscope, a part of the detection patterns 510 was corroded, and thus it was found that ink had entered under the flow path forming member 408 layered on the detection patterns 51. However, when a print check was performed, a good print was obtained. Thus, it was found that the floating is a level of the floating of the flow path forming member 408 that did not affect the printing. When a cross-section observation was performed, it was observed that the flow path forming member 408 had floated from the substrate 406 by approximately 0.2 um.

According to the present disclosure, a liquid discharge apparatus capable of detecting the peeling of the flow path forming member can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192910, filed Nov. 29, 2021, which is hereby incorporated by reference herein in its entirety.

What is claimed is:

1. A liquid discharge apparatus comprising:
a substrate;
a discharge port configured to discharge ink;
a flow path forming member formed on the substrate and in which a flow path configured to supply liquid to the discharge port is formed;
a detection unit arranged between the substrate and the flow path forming member and formed of a material of which an electrical resistance value changes by contacting the liquid; and
a measurement unit configured to measure the electrical resistance value of the detection unit.

2. The liquid discharge apparatus according to claim 1, wherein the detection unit is formed of a material including a metal that generates an electrochemical reaction by contacting the liquid.

3. The liquid discharge apparatus according to claim 1,
wherein a heating element configured to heat the liquid is formed on the substrate,
wherein an insulation layer is formed on the heating element to prohibit contact between the heating element and the liquid,
wherein a protective layer composed of a material including a metal is formed on the insulation layer,
wherein the detection unit and the protective layer are electrically connected, and
wherein the detection unit is composed of a metal that is easily ionized more than the material of the protective layer including the metal.

4. The liquid discharge apparatus according to claim 1, wherein the detection unit is composed of aluminum or an alloy including aluminum.

5. The liquid discharge apparatus according to claim 1, wherein the protective layer is formed of iridium or tantalum, or an alloy including iridium or tantalum.

6. The liquid discharge apparatus according to claim 1, further comprising a plurality of the detection units including the detection unit,
wherein the plurality of the detection units are connected in series.

* * * * *